United States Patent [19]
Montgomery, Sr.

[11] Patent Number: 5,205,667
[45] Date of Patent: Apr. 27, 1993

[54] PIVOT PIN FOR SHREDDER

[75] Inventor: Robert C. Montgomery, Sr., Jacksonville, Fla.

[73] Assignee: Montgomery Industries International Inc., Jacksonville, Fla.

[21] Appl. No.: 772,679

[22] Filed: Oct. 7, 1991

[51] Int. Cl.$^5$ .............................................. F16C 11/04
[52] U.S. Cl. ...................................... 403/151; 403/154; 403/161; 403/156; 411/338; 241/194; 16/263
[58] Field of Search ........................... 403/150-152, 403/154, 156, 161, 162, 13, 14, 153, 155, 119; 241/287, 195, 194, 196, 197; 474/228, 219, 210, 214-216; 411/424, 368, 338, 351, 383; 16/263, 381, 380; 89/86, 88-89

[56] References Cited

U.S. PATENT DOCUMENTS

| Re. 14,926 | 7/1920 | Plaisted | 241/194 |
|---|---|---|---|
| 365,718 | 6/1887 | Winchell | 241/32 |
| 1,185,620 | 6/1916 | Blum | 241/73 |
| 1,384,186 | 7/1921 | Fullington | 493/152 |
| 1,606,035 | 11/1926 | Mitts | 241/32 |
| 2,386,729 | 10/1945 | Watter | 411/338 |
| 3,610,543 | 10/1971 | Jensen | 241/73 |
| 3,627,212 | 11/1971 | Stanton | 241/73 |
| 3,703,741 | 11/1972 | Foster et al. | 16/263 X |
| 3,710,914 | 1/1973 | Lowey et al. | 411/338 X |
| 3,891,152 | 6/1975 | Guggenheimer | 241/88.4 |
| 4,009,836 | 3/1977 | Strom et al. | 241/73 |
| 4,015,783 | 4/1977 | Miller | 241/73 |
| 4,061,277 | 12/1977 | Whitney | 241/73 |
| 4,313,575 | 2/1982 | Stepaner | 241/197 |
| 4,353,459 | 10/1982 | Petersmack | 474/210 X |
| 4,519,551 | 5/1985 | Ceuruorst | 241/194 |

FOREIGN PATENT DOCUMENTS

| 2633012 | 1/1978 | Fed. Rep. of Germany | 241/194 |
|---|---|---|---|
| 2240655 | 3/1975 | France | 403/162 |

*Primary Examiner*—Peter M. Cuomo
*Assistant Examiner*—Harry C. Kim
*Attorney, Agent, or Firm*—Nies, Kurz, Bergert & Tamburro

[57] ABSTRACT

An improved pivot pin which allows individual pin connection of each hammer in the rotor of a shredder is disclosed. The pivot pin includes male and female pin members which interengage in a tight fit so as to function as a single pin when fitted together. A bore extends through both of the male and female pin members, with the bore through the female pin member being threaded. A securing device such as a socket head capscrew passes through the male pin member from the outer to the inner end portion thereof and is threadedly received in the female pin member.

8 Claims, 4 Drawing Sheets

5,205,667

1

PIVOT PIN FOR SHREDDER

BACKGROUND AND SUMMARY OF THE INVENTION

The present invention relates to new and useful improvements in shredders. More particularly the invention is directed to an improved pivot pin for use in shredding devices where reduction in material size is accomplished by rotary hammers acting on the material through impact and cutting action.

Previous shredders and related equipment are described, for example, in the following U.S. Pat. Nos.: 365,718 to Winchell; 1,185,620 to Blum; Re. 14,926 to Plaisted; 1,606,035 to Mitts; 3,610,543 to Jensen; 3,627,212 to Stanton; 3,722,805 to Strom; 3,891,152 to Guggenheimer; 4,009,836 to Strom et al.; 4,015,783 to Miller; and 4,061,277 to Whitney.

Shredders such as are described in the above patents have as their purpose the reduction of material into smaller, more manageable pieces. The typical shredder has a housing and a rotor which revolves in the housing. The rotor has on its ends breaking elements which reduce incoming material in size. The material then passes through a screening device which allows only sufficiently reduced material to pass.

It is an object of the present invention to provide a shredder in which the rotor is designed to allow individual pin connection of each breaking hammer, thus simplifying the maintenance and reducing time to change out the hammers.

It is another object of the present invention to provide a pivot pin which is of a size and configuration such that either part of the two-part pin will fit between the breaker rings in the same area where the hammer fits between the breaker rings.

DESCRIPTION OF THE PREFERRED EMBODIMENTS

Figure 1:
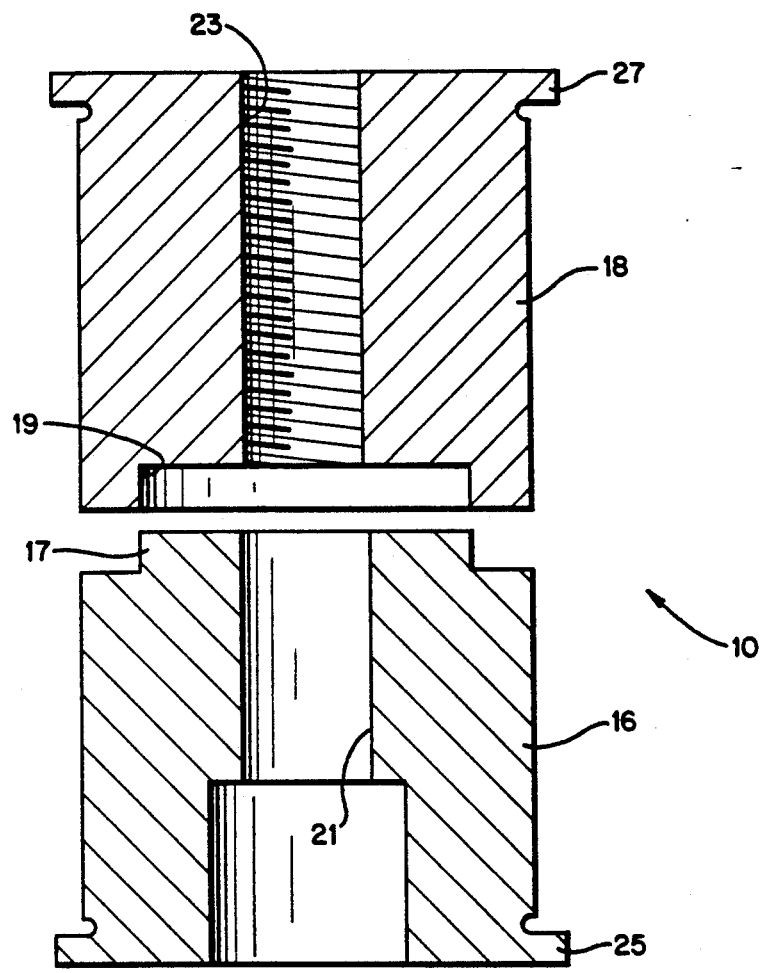
FIG. 1 is a side view in cross section of the pivot pin of the present invention.
Figure 2:
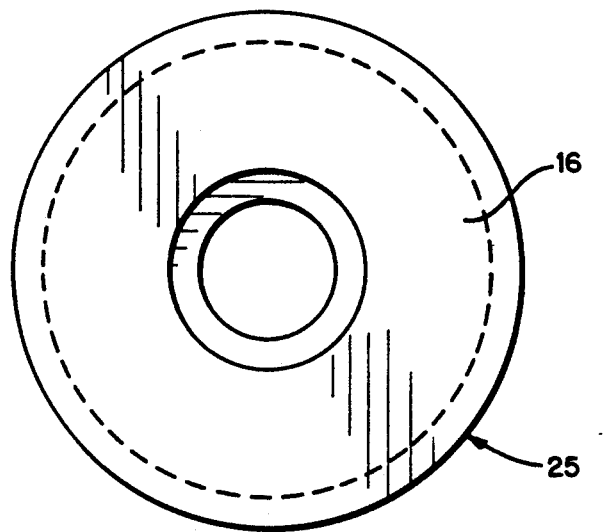
FIG. 2 is an end view of the pivot pin of FIG. 1.
Figure 3:
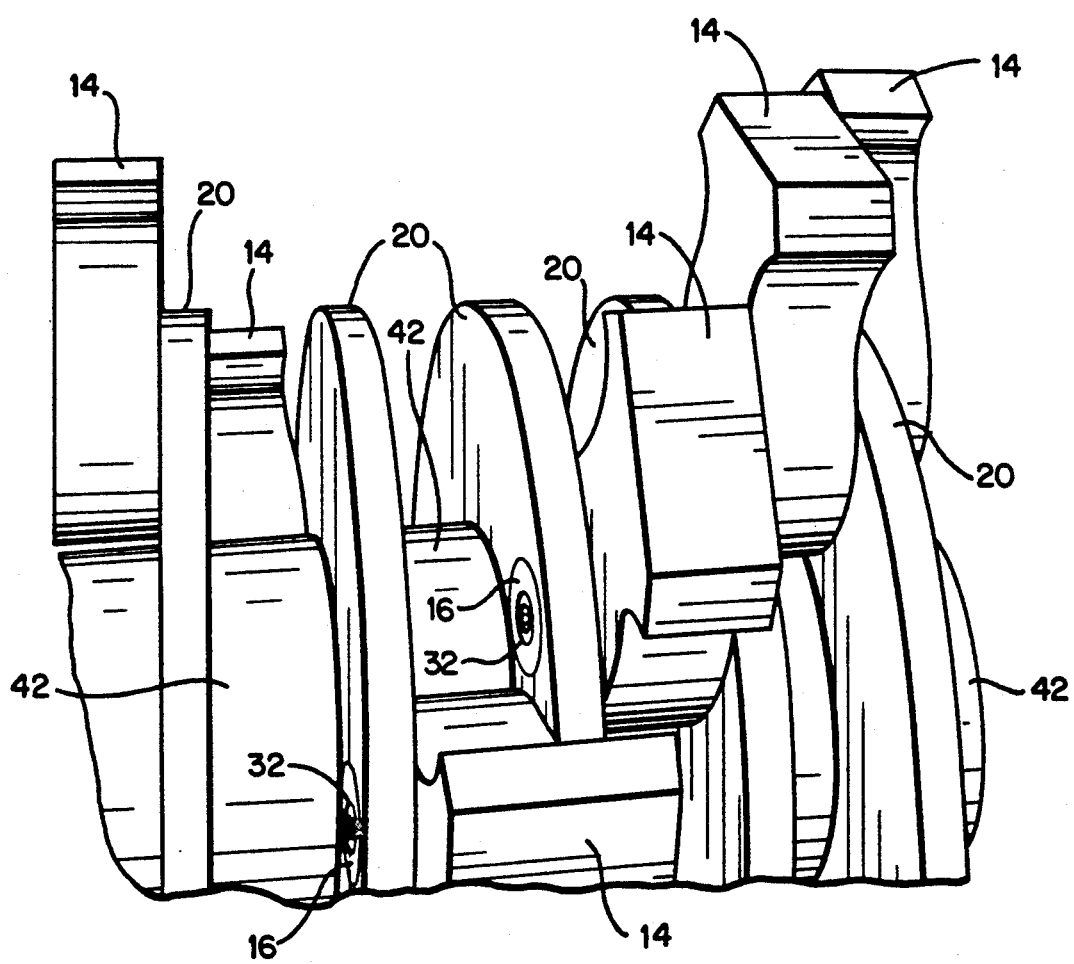
FIG. 3 is a perspective view of the rotor cutting portion of a shredder, showing the pivot pin of the present invention.

In the embodiment of the invention as shown in FIGS. 1 through 4, there is provided a central rotor shaft 12 which passes through the rotor assembly of a hog or shredder device. A "swing" hammer 14 is pinned by respective pin members 16 and 18 so as to be rotatably mounted with respect to a ring or clevis 20 on each side of the hammer 14. As shown in FIG. 3, a plurality of hammers 14 may be employed along the shaft 12, with each ring or clevis 20 serving as a point of attachment for two adjacent hammers 14. Also, two additional hammers 14 may be attached to the ring 20 at positions diametrically opposite to the positions shown.

Each hammer 14 is rotatably mounted on its respective rings 20 by pivot pin 10 with female pin member 18 receiving male pin member 16 and passing through a hole 26 in the hammer 14 and holes 28 in each ring 20.

Figure 4:
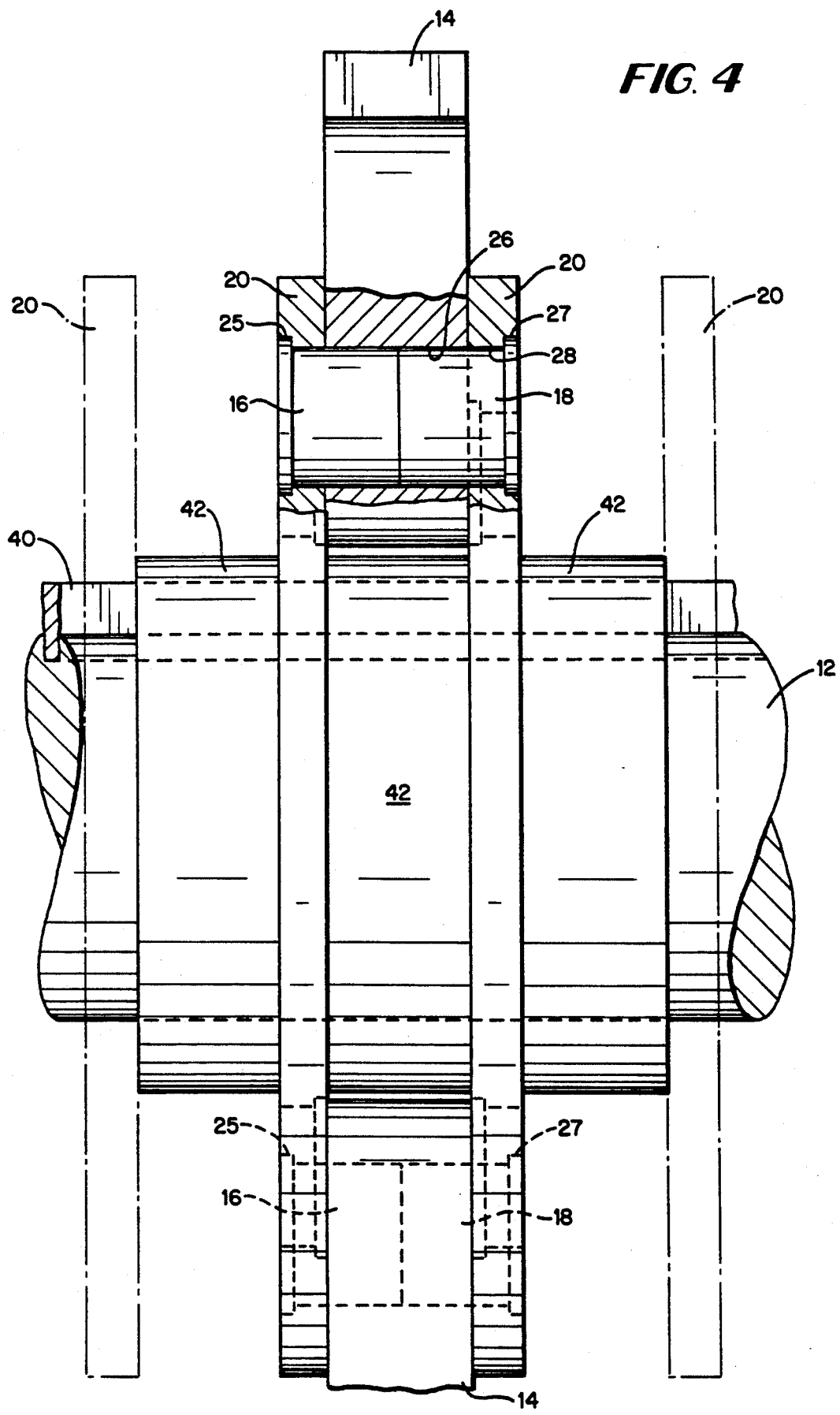
FIG. 4 is a side view in partial cross section of the rotor cutting portion of FIG. 3 with pivot pin installed.

As shown in FIG. 4, a key 40 is installed in the shaft 12 and the key 40 passes through a keyway in each ring 20. A spacer ring 42 is mounted on the shaft 12 between each pair of rings 20 and a keyway is also provided in these spacer rings 42 for the key 40.

In the embodiments as shown, the hammer 14 is free to rotate about the pin 10 and the hammers will describe a cutting circle upon rotation of the shaft 12. FIGS. 1 and 2 show a pivot pin 10 which includes male pin member 16 and female pin member 18 to mount the hammer 14 to the rings 20 attached to the shaft 12. Existing hammer hogs use a solid steel shaft that goes through a number of hammers. The size of the pin members 16, 18 in the present invention is such that either of the pin members 16, 18, which are of approximately equal length, will fit between the rings 20 in the same area where the hammer 14 fits between the rings 20, thus allowing for individual pin connection of each hammer 14.

The male pin member 16 is inserted from one side of the hammer 1 and the female pin member 18 is inserted from the other side of the same hammer 14. The male pin member 16 and the female pin member 18 are machine surfaced so that both pin members 16, 18 will act as a single pin when fitted together. The male pin member 16 has an outwardly extending shoulder portion 17 of reduced diameter at the inner end thereof which interengages with an inwardly extending recess 19 at the inner end of the female pin member 18.

A socket head capscrew 32 is inserted through a bore 21 in the male pin member 16 and is threadedly received by a corresponding bore 23 in the female pin member 18 so as to keep the pin members 16, 18 together during normal operation. As the bolt of the capscrew is tightened down, the halves 16, 18 of the pin are drawn together in a very tight fit. Each of the pin members 16, 18 has an enlarged head or flange portion 25, 27 which engages corresponding indentations in the outer surfaces of the rings 20 as the halves 16, 18 of the pin are drawn together. These flanges 25, 27 help to maintain the pin members 16, 18 in position and prevent the members 16, 18 from shifting.

The recess 19 of the female pin member 18 is of slightly greater length than the shoulder portion 17 of male pin member 16 to make certain that the shoulder 17 of the male pin member 16 does not bottom out on the recess 19 in the female pin member 18 because this would result in a sloppy fit where flanges 25 and 27 engage the sides of the rings 20. In one embodiment of the invention, the shoulder portion 17 had a length of 5/16 inches.

The maximum length of both the male 16 and female 18 pin members is restricted by the distance between adjacent rings 20. This restriction in turn restricts the length of the shoulder 17 of the male pin member 16 and the depth of the recess 19 on the female pin member 18.

The relative dimensions of the shoulder portion 17 and recess 19 with regard to the male 16 and female 18 pin members should be such as to provide sufficient bearing surfaces and adequate thicknesses so that the members 16, 18 will not fail upon application of force under operating conditions.

This individual pin connection of pin members 16, 18 allows a single hammer to be removed without disturbing the other hammers 14 in the machine, thus simplifying the maintenance and greatly reducing the time necessary to change out the hammers 14.

Figure 5:
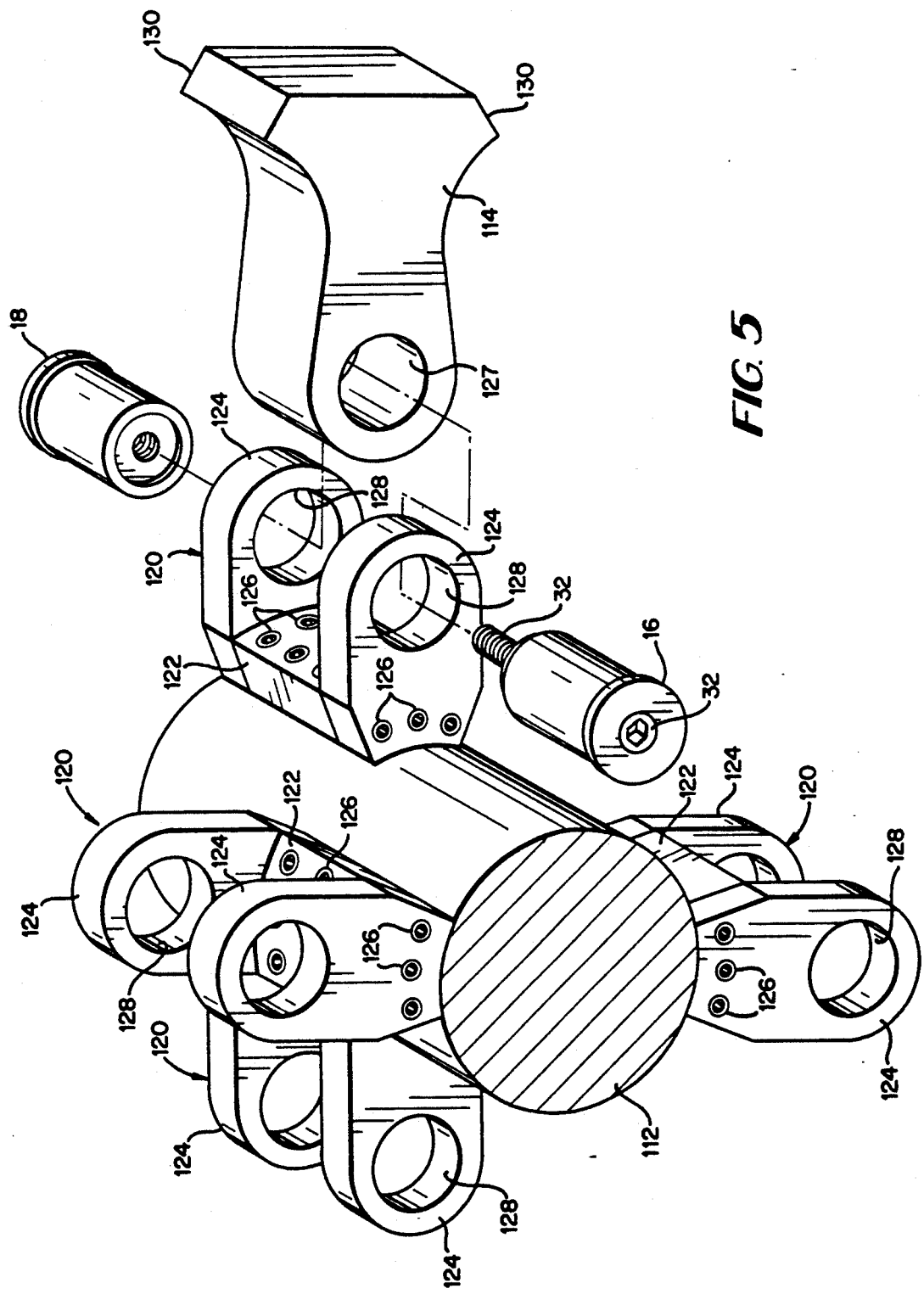
FIG. 5 is an exploded perspective view in partial cross section of an alternative embodiment of the rotor cutting portion of a shredder, showing the pivot pin of the present invention.

In an alternative embodiment of a rotor as shown in FIG. 5, each ring or clevis 120 includes a center section 122 and a pair of end sections 124, with bolts 126 being employed both for securing the end sections 124 to the respective center section 122 and also for attachment of each ring segment 120 to the shaft 112. Each hammer 114 is rotatably mounted on its respective ring segment 120 by pin members 16, 18 passing through a hole 127 in the hammer 114 and holes 128 in the end sections 124 of each ring 120. In the embodiment as shown in FIG. 5, four hammers 114 are employed and staggered at successive angles of 90 degrees along the length of the shaft 112 to create a spiral rotor effect when the shaft 112 is turned under power. Each hammer 114 may be provided with hardened cutting edges 130 as shown.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A pivot pin assembly for use such as in pivotally mounting a swing hammer on a ring for use in a shredder comprising:

a cylindrical-shaped male pin member with inner and outer end portions and having an outwardly extending cylindrical-shaped shoulder portion at the inner end thereof, said shoulder portion being coaxial with the male pin member and being of uniform height around the circumference thereof;

a cylindrical-shaped female pin member with inner and outer end portions and having an inwardly extending cylindrical-shaped recess at the inner end thereof of a size for receiving the shoulder portion of said male pin member, said recess being coaxial with the female pin member and being of uniform depth around the circumference thereof; and a means for securing said male and female members, wherein said means for securing includes a bore extending through each of the male and female pin members, wherein the bore through the female pin member is threaded, and further including a screw means which passes through said male pin member from the outer to the inner end portion thereof, and wherein the screw means is threadly received in said female pin member.

2. The pivot pin assembly of claim 1 wherein the male and female pin members are of equal diameter.

3. The pivot pin assembly of claim 1 wherein the shoulder portion of said male pin member and the recess of said female pin member have machined surfaces.

4. The pivot pin assembly of claim 1 wherein the male pin member and the female pin member are of approximately equal length.

5. The pivot pin assembly of claim 1 wherein said screw means is a socket head capscrew.

6. A rotor assembly for a shreadder used in the reduction of material to small pieces, comprising:

a rotor shaft; a pair of ring members mounted in spaced relation along said shaft; and a hammer member rotatably mounted between said ring members, wherein the hammer member is rotatably mounted between said ring members by a pivot pin which passes through the hammer and the ring members, said pivot pin including a male pin member, a female pin member and means for securing said male and female pin members, wherein the male pin member is of cylindrical shape having inner and outer end portions and an outwardly extending cylindrical-shaped shoulder portion at the inner end thereof, said shoulder portion being coaxial with the male pin member and being of uniform height around the circumference thereof, and wherein the female pin member is of cylindrical shape having inner and outer end portions and an inwardly extending cylindrical-shaped recess at the inner end thereof of a size for receiving the shoulder portion of said male pin member, said recess being coaxial with the female pin member and being of uniform depth around the circumference thereof, wherein said means for securing includes a bore extending through each of the male and female pin members, wherein the bore through the female pin member is threaded, and further including a screw means which passes through said male pin member from the outer to the inner end portion thereof, and wherein the screw means is threadly received in said female pin member.

7. The rotor assembly of claim 6 wherein the male pin member and the female pin member are of approximately equal length.

8. The rotor assembly of claim 6 wherein said screw means is a socket head capscrew.

* * * * *

UNITED STATES PATENT AND TRADEMARK OFFICE
CERTIFICATE OF CORRECTION

PATENT NO. : 5,205,667
DATED : April 27, 1993
INVENTOR(S) : Montgomery, Sr.

It is certified that error appears in the above-identified patent and that said Letters Patent is hereby corrected as shown below:

Column 1, line 59, cancel "respective", insert --pivot pin 10 which includes--.

Column 2, line 23, cancel "1", insert --14--.

Column 2, line 67, cancel "a lows", insert --allows--.

Signed and Sealed this

Eleventh Day of January, 1994

Attest:

BRUCE LEHMAN

Attesting Officer

Commissioner of Patents and Trademarks